UNITED STATES PATENT OFFICE.

FRIEDRICH STOLZ AND FRANZ FLÄCHER, OF HÖCHST-ON-THE-MAIN, GERMANY, ASSIGNORS TO FARBWERKE VORM. MEISTER LUCIUS & BRÜNING, OF HÖCHST-ON-THE-MAIN, GERMANY, A CORPORATION OF GERMANY.

DERIVATIVES OF DIOXYDIAMINO-ARSENOBENZENE AND PROCESS OF MAKING SAME.

1,048,002.   Specification of Letters Patent.   Patented Dec. 24, 1912.

No Drawing.   Application filed March 16, 1912.   Serial No. 684,303.

To all whom it may concern:

Be it known that we, FRIEDRICH STOLZ, Ph. D., chemist, and FRANZ FLÄCHER, Ph. D., chemist, citizens of the Empire of Germany, residing at Höchst-on-the-Main, Germany, have invented certain new and useful Improvements in Derivatives of Dioxydiamino-Arsenobenzene and Processes of Making Same, of which the following is a specification.

We have found that new acids of great value can be obtained by causing monchalogen-acetic acid or a homologue thereof to act upon dioxydiaminoarsenobenzene, the acid residues being capable of entering into one or both amino groups according to the quantity of acid used. When treated with alkalis or alkaline earths these acids form salts, readily soluble in water and of neutral reaction, which offer considerable advantages as compared with the form in which the dioxydiaminoarsenobenzene has been used hitherto, namely an acid solution or an alkaline solution or a neutral suspension, because the use of the said salts in therapeutics is not attended by undesirable secondary effects. These new products contain the radical:

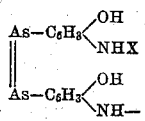

wherein the "X" stands for the residue of a fatty acid.

The following examples illustrate the invention:

Example I: A solution of 100 grams of dioxydiaminoarsenobenzene-dihydrochlorid in 300 ccm. each of methylalcohol and water is neutralized with caustic soda lye. There is then added to the suspension of the free base thus obtained a solution of 40 grams of chloracetic acid in 5 to 10 times its weight of water and the whole is heated for some hours to 60–65° C., advantageously with exclusion of air, which can be attained by introducing an indifferent gas such as carbon dioxid, hydrogen or nitrogen; during the heating the suspended base dissolves. The dioxyaminoarsenobenzene-amino-acetic acid thus formed is caused to separate by adding caustic soda lye until the liquid no longer shows any but a feebly acid reaction, it is then filtered off and washed with water. If potassium iodid be present during the reaction of the chloracetic acid, the transformation is greatly facilitated. In the place of a solution of free chloracetic acid there may be employed a solution of the sodium salt of chloracetic acid; in this case the product remains undissolved. If an excess of halogen-acetic acid, for instance 4 molecular proportions of it, is caused to act upon dioxydiaminoarsenobenzene, or if the dioxyaminoarsenobenzene-monoamino-acetic acid is again treated with halogen-acetic acid, the dioxyarsenobenzene-diamino-acetic acid is obtained.

Example II: 100 grams of hydrochlorid of dioxydiaminoarsenobenzene are dissolved in 300 ccm. of methyl alcohol and 300 ccm. of water and mixed with 4 molecular proportions of caustic soda lye. The clear solution is mixed with a solution of 50 grams of sodium chloracetate and 36 grams of potassium iodid in 5–10 times their weight of water and heated for three hours to 60–65° C. without access of air. The product thus formed is separated by slightly acidifying the alkaline solution, and is then further treated as indicated in Example I. The dioxyaminoarsenobenzene-amino-acetic acid

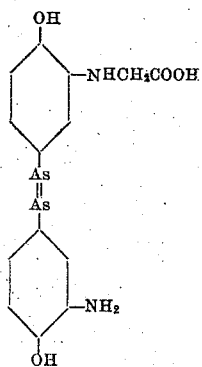

forms a yellow powder, readily soluble in alkalis and in an excess of acid. It is insoluble in almost all of the usual solvents. For transforming the acid into the sodium salt, it is mixed and stirred with water to form a thin magma, to which caustic soda lye or a solution of sodium carbonate is added until the reaction is neutral; the solution thus obtained is filtered and mixed with ten times its weight of alcohol or acetone.

The sodium salt thus precipitated is filtered and washed with alcohol and ether. Instead of precipitating the aqueous solution of the sodium salt with alcohol or acetone, this solution may be evaporated in a vacuum. The sodium salt of the dioxyaminoarsenobenzene-amino-acetic acid is of a yellowish-brown color; it readily dissolves to a neutral solution in water. It is insoluble in alcohol and acetone. By adding to the aqueous solution diluted hydrochloric acid, a yellow, flaky precipitate is obtained which re-dissolves in an excess of acid. If for the neutralization of the free dioxyaminoarsenobenzene-amino-acetic acid potassium lye or ammonia is used, the corresponding salt is obtained. The potassium salt is a yellowish-brown powder readily dissolving in water with neutral reaction. It entirely resembles the sodium salt in its behavior. The ammonium salt of the dioxyaminoarsenobenzene-amino-acetic acid is yellowish-brown and gives in water a clear solution with a neutral reaction. When kept for a prolonged time, it loses some ammonia and then dissolves in water to a turbid solution, which, on addition of a small quantity of ammonia, becomes again clear. If to this solution diluted hydrochloric acid is added, a yellow, flaky precipitate separates which re-dissolves in an excess of acid.

Example III: One molecular proportion of dihydrochlorid of dioxydiaminoarsenobenzene is dissolved in three times its quantity of methyl alcohol and water and neutralized with caustic soda lye. To the separated base are added 2 molecular proportions of α-brompropionic acid dissolved in three to five times its quantity of water, and the mixture is heated to 60-65° C. until the separated base is dissolved. After cooling, caustic soda lye is gradually added so long as there is still a feebly acid reaction; the dioxyaminoarsenobenzene-amino-propionic acid thus isolated is filtered off and washed with water. The dioxyaminoarsenobenzene-amino-propionic acid

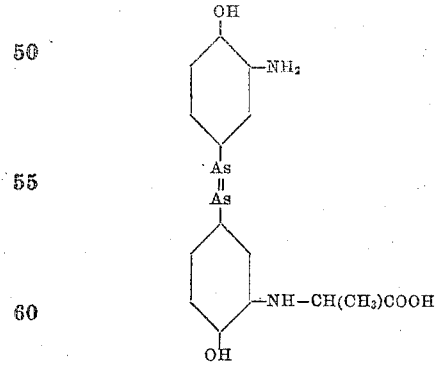

is of a yellow color, it dissolves in alkalis, and also in an excess of hydrochloric acid, and is insoluble in almost all of the usual solvents. For preparing the sodium salt of the dioxyaminoarsenobenzene-amino-propionic acid, the acid is diluted with water so as to form a thin magma, and neutralized with caustic soda lye or a solution of sodium carbonate. The solution thus obtained is filtered and mixed with ten times its weight of alcohol or acetone. The sodium salt thus precipitated is filtered and washed with alcohol. The sodium salt of the dioxyaminoarsenobenzene-amino-propionic acid is a yellow powder, readily dissolving to a neutral solution in water and being insoluble in alcohol and acetone. By adding to the aqueous solution hydrochloric acid, a yellow precipitate forms which re-dissolves in an excess of acid.

Example IV: 500 grams of dihydrochlorid of dioxydiaminoarsenobenzene are dissolved in 1500 ccm. each of methyl alcohol and water and neutralized with caustic soda lye. After having added 320 grams of bromacetic acid in 5 times its weight of water, the mixture is heated for one hour to 60-65° C., while introducing nitrogen, until the separated precipitate is completely dissolved. There is then added caustic soda lye until there is a feebly acid reaction, whereupon the precipitate is filtered off and washed with water. The dioxyaminoarsenobenzene-monoamino-acetic acid thus obtained is mixed with three times its quantity of water and again heated to 60-65° C. with an aqueous solution of 320 grams of bromacetic acid until the solution is complete. The thus formed dioxyarsenobenzene-diamino-acetic acid:

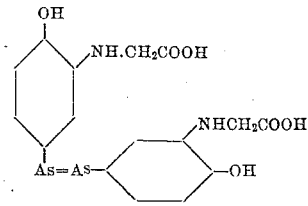

is then precipitated by gradually adding caustic soda lye until the liquid shows but a feebly acid reaction. It is filtered under pressure, washed with water and for transforming it into the di-sodium salt, is neutralized with caustic soda lye. This di-sodium salt is precipitated from the filtered solution with alcohol or acetone. The dioxyarsenobenzene-diamino-acetic acid may also be prepared by using from the outset 4 instead of 2 molecular proportions of bromacetic acid. The separation of the dioxyaminoarsenobenzene-mono-amino-acetic acid thereby becomes unnecessary. The di-sodium salt of the dioxyarsenobenzene-diamino-acetic acid is of a yellowish-brown color and readily dissolves in water with neutral reaction, being insoluble in alcohol and acetone. By adding to the aqueous solution diluted hydrochloric acid, a yellow, flaky precipitate is obtained, which redissolves in an excess of acid.

Having now described our invention, what we claim, is:

1. The process of manufacturing derivatives of dioxydiaminoarsenobenzene, which consists in causing the monohalogen-substituted acids of the acetic acid series to act upon dioxydiaminoarsenobenzene.

2. The process of manufacturing derivatives of dioxydiaminoarsenobenzene, which consists in causing monohalogen-acetic acid to act upon dioxydiaminoarsenobenzene.

3. As new products, the glycin derivatives of dioxydiaminoarsenobenzene containing the radical:

wherein the "X" stands for the residue of a fatty acid, said products being yellow powders, readily soluble in alkalis and in an excess of hydrochloric acid, insoluble in almost all of the organic solvents, forming in the shape of their alkali salts yellow to yellowish-brown powders which readily dissolve in water with a neutral reaction and are insoluble in alcohol and acetone.

4. As a new product, the derivative of dioxydiaminoarsenobenzene of the constitution:

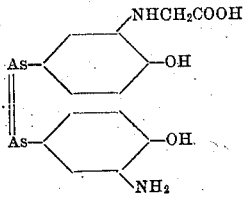

said product being a yellow powder readily soluble in alkalis and in an excess of hydrochloric acid, insoluble in water and in almost all of the organic solvents, forming in the shape of its alkali salt a yellowish-brown powder which readily dissolves in water with a neutral reaction and is insoluble in alcohol and acetone.

In testimony whereof, we affix our signatures in presence of two witnesses.

FRIEDRICH STOLZ.
FRANZ FLÄCHER.

Witnesses:
JEAN GRUND,
CARL GRUND.